US012517397B2

(12) United States Patent
Yajima et al.

(10) Patent No.: US 12,517,397 B2
(45) Date of Patent: Jan. 6, 2026

(54) BACKLIGHT AND DISPLAY DEVICE

(71) Applicant: Magnolia White Corporation, Tokyo (JP)

(72) Inventors: Toshihiro Yajima, Tokyo (JP); Michihide Shibata, Tokyo (JP); Takashi Ota, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/437,359

(22) Filed: Feb. 9, 2024

(65) Prior Publication Data
US 2024/0288731 A1 Aug. 29, 2024

(30) Foreign Application Priority Data

Feb. 24, 2023 (JP) ................................ 2023-027116

(51) Int. Cl.
*G02F 1/00* (2006.01)
*G02F 1/1335* (2006.01)
*G02F 1/13357* (2006.01)

(52) U.S. Cl.
CPC .. *G02F 1/133614* (2021.01); *G02F 1/133603* (2013.01); *G02F 1/133605* (2013.01)

(58) Field of Classification Search
None
See application file for complete search history.

(56) References Cited

U.S. PATENT DOCUMENTS

| | | | |
|---|---|---|---|
| 2015/0369988 A1* | 12/2015 | Hsu | G02F 1/1336 349/61 |
| 2018/0182940 A1 | 6/2018 | Yamamoto et al. | |
| 2018/0341151 A1* | 11/2018 | Kurita | G02F 1/133608 |
| 2021/0116751 A1* | 4/2021 | Iwamoto | H05B 45/325 |
| 2021/0311363 A1* | 10/2021 | Sun | G02F 1/133601 |
| 2022/0146881 A1* | 5/2022 | Cong | H01L 33/505 |
| 2022/0214580 A1* | 7/2022 | Park | G02F 1/133614 |
| 2022/0308399 A1* | 9/2022 | Masuda | G02B 6/0055 |
| 2023/0194927 A1* | 6/2023 | Lee | G02F 1/133603 362/97.3 |

FOREIGN PATENT DOCUMENTS

JP 2018-107257 A 7/2018

* cited by examiner

*Primary Examiner* — Gerald J Sufleta, II
(74) *Attorney, Agent, or Firm* — Michael Best & Friedrich LLP

(57) ABSTRACT

A backlight includes a light source in which blue LEDs are planarly arranged in a matrix with a first interval, and a color conversion sheet disposed covering the light source. First red quantum dots that receive blue light and emit red light, and first green quantum dots that receive blue light and emit green light are dispersed in the color conversion sheet. An RG quantum dot layer, in which second red quantum dots that receive blue light and emit red light and second green quantum dots that receive blue light and emit green light are dispersed, is disposed around each of the blue LEDs in planar view.

15 Claims, 14 Drawing Sheets

BACKLIGHT AND DISPLAY DEVICE

CLAIM OF PRIORITY

The present application claims priority from Japanese patent application JP 2023-27116 filed on Feb. 24, 2023, the content of which is hereby incorporated by reference into this application.

BACKGROUND

The present invention relates to a backlight and a display device including the backlight, and particularly relates to a display device that uses local dimming to achieve a high contrast screen.

Since a backlight capable of local dimming is mainly used in a liquid crystal display device, the following description will be given with reference to the liquid crystal display device. A liquid crystal display device includes a TFT substrate on which pixel electrodes, thin film transistors (TFTs), and the like are formed in a matrix, and a counter substrate disposed opposite to the TFT substrate, with a liquid crystal layer sandwiched between the TFT substrate and the counter substrate. An image is formed by controlling light transmittance of liquid crystal molecules for each pixel.

In the liquid crystal display device, pixel size can be reduced, resulting in high definition of the liquid crystal display device. However, the liquid crystal display device is low in image contrast compared to an organic EL display device. Local dimming therefore has been developed as a method for improving contrast of the liquid crystal display device. Examples of a related art on the local dimming include Japanese Unexamined Patent Application Publication No. 2018-107257.

SUMMARY

Display devices for virtual reality (VR) and medical use require images with higher resolution and higher contrast. When local dimming is used in such a display device, more fine control is also required for local dimming.

On the other hand, if luminance distribution is sharp like LED, and when a backlight side is viewed from above the backlight or from above a liquid crystal display panel disposed above the backlight, LED is unintentionally seen. Such a phenomenon is called "chip visibility".

To prevent this, a plurality of diffusion sheets each having a large diffusion effect are probably used. However, if many diffusion sheets with the large diffusion effects are used, fine local dimming cannot be performed. In addition, use of many diffusion sheets reduces front luminance of the backlight.

An object of the invention is to cope with such problems and achieve a backlight that enables fine local dimming in a display device.

The invention solves the above problems, and main specific measures are as follows.

(1) A backlight including: a light source in which blue LEDs are planarly arranged in a matrix with a first interval; and a color conversion sheet disposed covering the light source, where first red quantum dots that receive blue light and emit red light, and first green quantum dots that receive blue light and emit green light are dispersed in the color conversion sheet, and an RG quantum dot layer, in which second red quantum dots that receive blue light and emit red light and second green quantum dots that receive blue light and emit green light are dispersed, is disposed around each of the blue LEDs in planar view.

(2) A backlight including: a light source in which blue LEDs are planarly arranged in a matrix with a first interval; and a color conversion sheet disposed covering the light source, where first red quantum dots that receive blue light and emit red light, and first green quantum dots that receive blue light and emit green light are dispersed in the color conversion sheet, an RGB quantum dot layer, in which second red quantum dots that receive blue light and emit red light, second green quantum dots that receive blue light and emit green light, and blue quantum dots that receive light with a shorter wavelength than blue light or receive ultraviolet rays and emit blue light are dispersed, is disposed around each of the blue LEDs in planar view, and a short-wavelength LED emitting the shorter-wavelength light is disposed within a range where the RGB quantum dot layer is formed in planar view.

(3) A backlight including: a light source in which blue LEDs are planarly arranged in a matrix with a first interval; and a color conversion sheet disposed covering the light source, wherein first red quantum dots that receive blue light and emit red light, and first green quantum dots that receive blue light and emit green light are dispersed in the color conversion sheet, a B quantum dot layer, in which blue quantum dots that receive light with a shorter wavelength than blue light or receive ultraviolet rays and emit blue light are dispersed, is disposed around each of the blue LEDs in planar view, and a short-wavelength LED emitting the shorter-wavelength light is disposed within a range where the B quantum dot layer is formed in planar view.

DESCRIPTION OF THE PREFERRED EMBODIMENTS

Hereinafter, the invention will be described in detail with some embodiments. Since a backlight capable of local dimming is mainly used in a liquid crystal display device, the following description is given with reference to the liquid crystal display device.

Figure 1:
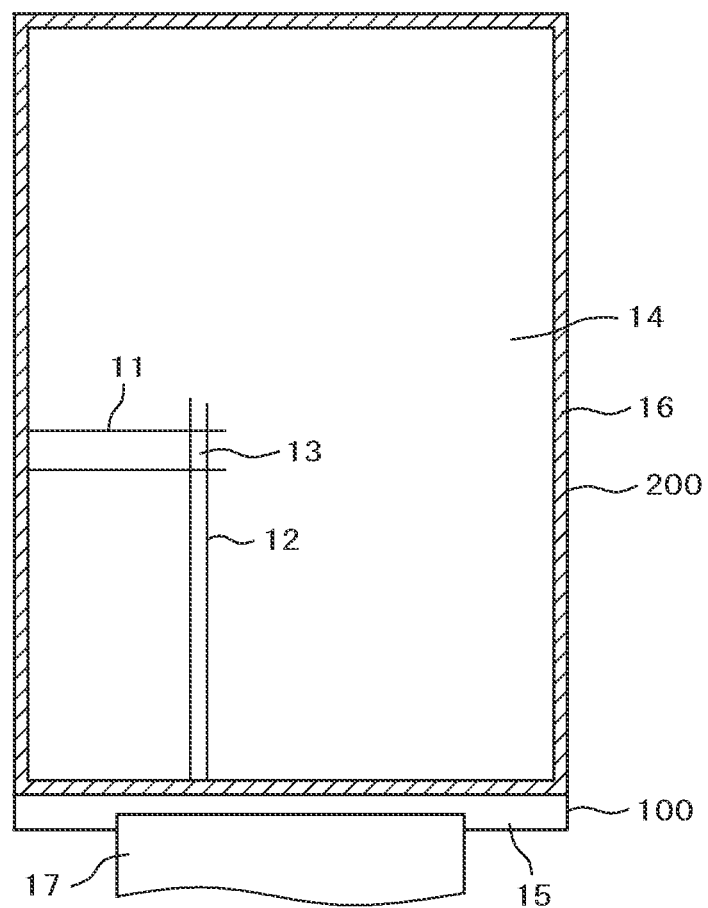
FIG. 1 is a plan view of a liquid crystal display device.

FIG. 1 is a plan view of an exemplary liquid crystal display device. In FIG. 1, a TFT substrate 100 and a counter substrate 200 are bonded together with a sealant 16, and liquid crystal is sandwiched inside therebetween. A display region 14 is formed in a portion where the TFT substrate 100 overlaps the counter substrate 200. In the display region 14, scanning lines 11 extend in a horizontal direction (x direction) and are arranged in a vertical direction (y direction). Video signal lines 12 extending in the vertical direction are arranged in the horizontal direction. A pixel 13 is formed in a region surrounded by the scanning lines 11 and the video signal lines 12.

In FIG. 1, a portion, in which the TFT substrate 100 does not overlap the counter substrate 200, is formed as a terminal region 15. A flexible wiring board 17 is connected to the terminal region 15 to supply power and signals to a liquid crystal display panel. A driver IC for driving the liquid crystal display panel is mounted on the flexible wiring board 17. A backlight is disposed on the back of the TFT substrate 100, as shown in FIG. 2.

Figure 2:
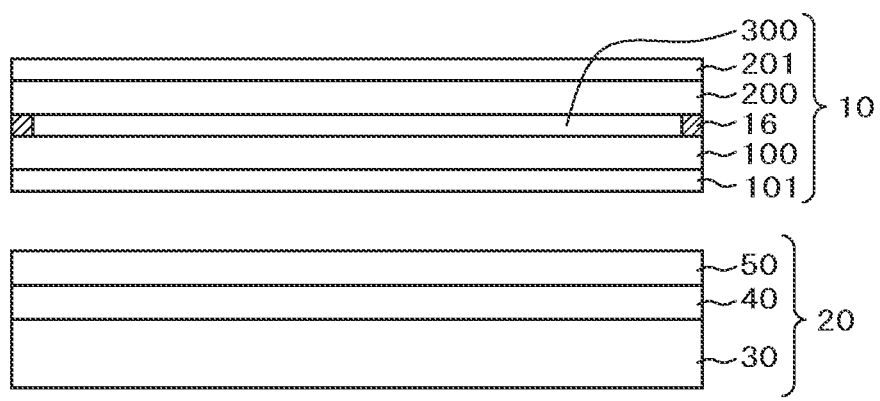
FIG. 2 is a cross sectional view of the liquid crystal display device.

FIG. 2 is a cross sectional view of the liquid crystal display device. In FIG. 2, a backlight 20 is disposed on the back of the liquid crystal display panel 10. The liquid crystal display panel 10 has the following configuration. Specifically, the counter substrate 200, on which a black matrix and color filters are formed, is disposed opposite to the TFT substrate 100 on which pixel electrodes, common electrodes, TFTs, the scanning lines, the video signal lines, and the like are formed. The TFT substrate 100 and the counter substrate 200 are bonded at their peripheries with a sealant 16, and a liquid crystal 300 is enclosed inside therebetween.

Liquid crystal molecules are initially aligned by alignment films formed on the TFT substrate 100 and the counter substrate 200. When a voltage is applied between the pixel electrode and the common electrode, the liquid crystal molecules rotate to control light from the backlight 20 for each pixel, so that an image is formed. Since the liquid crystal 300 can control only polarized light, a lower polarizing plate 101 is disposed under the TFT substrate 100 to allow only the polarized light to enter the liquid crystal 300. The light modulated by the liquid crystal 300 is analyzed by an upper polarizing plate 201, and an image is viewed.

In FIG. 2, the backlight 20 is disposed at the back of the liquid crystal display panel. In the backlight 20, a color conversion sheet 40 is disposed on a light source 30, and an optical sheet group 50 including various optical sheets is disposed on the color conversion sheet 40. While the backlight 20 of the display device includes a sidelight type in which light sources such as LEDs are disposed on a side of a light guide plate, and a direct type in which light sources such as LEDs are arranged in a matrix on a plane, the direct-type backlight is used in the invention.

In FIG. 2, a blue LED is used as the LED, and the color conversion sheet 40 converts blue to white. While the color conversion sheet 40 includes a phosphor sheet using a phosphor and a quantum dot sheet using quantum dots, a case of using the quantum dot sheet is discussed in this description. The optical sheet group 50 includes various diffusion sheets and prism sheets. A specific configuration of the optical sheets will be described later.

When an image is displayed on the liquid crystal display device, a bright portion transmits backlight, and a dark portion shields the backlight. Image contrast is defined by a ratio of the bright portion to the dark portion. In the liquid crystal display device, the dark portion is formed by shielding light from the backlight with liquid crystal. However, the backlight is not perfectly shielded by the liquid crystal, and thus some light leaks. As a result, contrast is reduced.

Figure 3:
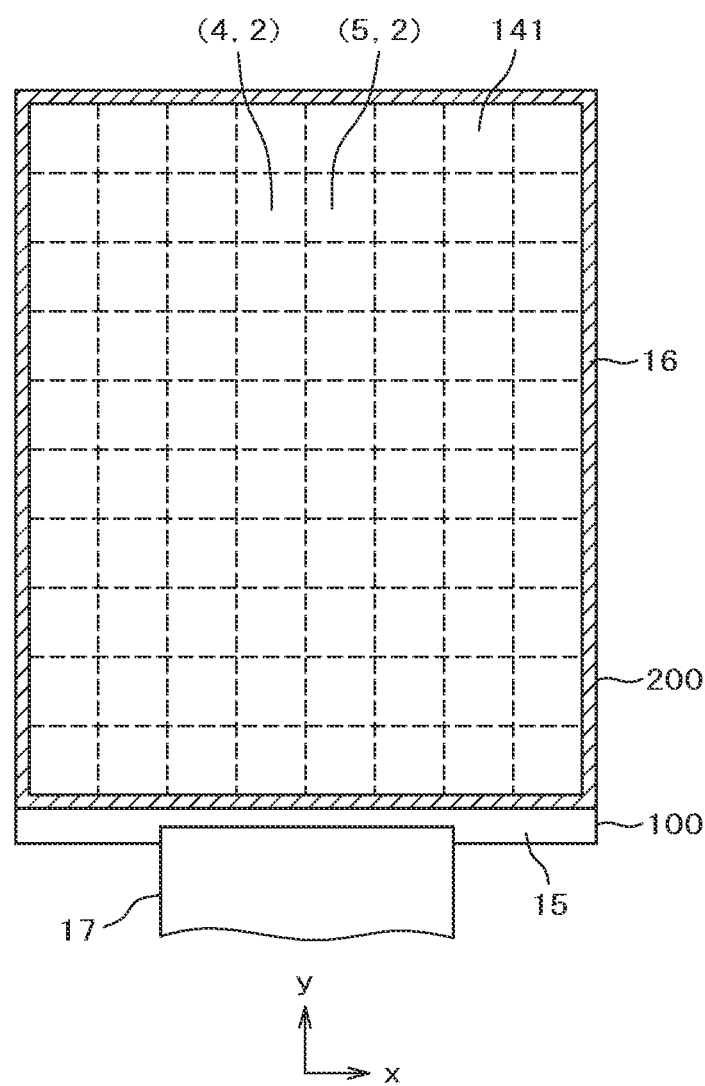
FIG. 3 is a plan diagram showing an example of segments for local dimming operation in the liquid crystal display device.

In local dimming, the dark portion is not irradiated with the backlight, enabling deep black display. As a result, high contrast can be achieved. FIG. 3 illustrates an exemplary liquid crystal display device, showing an aspect of local dimming. FIG. 3 is a plan view of the liquid crystal display device with the same configuration as that described with FIG. 1. In FIG. 3, the display region 14 is divided into segments 141. Although the dotted line in FIG. 3 shows a boundary of the segment 141, this is merely shown for convenience, and the liquid crystal display panel actually does not have such a boundary. In the backlight, a light source is disposed at a position corresponding to each segment.

In FIG. 3, a segment (4, 2) is assumed as the bright portion, and a segment (5, 2) is assumed as the dark portion. In local dimming, a light source, i.e., LED, is turned on at a portion of the segment (4, 2), but is not turned on at a portion of the segment (5, 2). As a result, deep black display is achieved in the portion of the segment (5, 2), leading to high contrast.

However, since there is no boundary between the segments, light from the segment (4, 2) may extend to the segment (5, 2) depending on luminance distribution between the segments, for example. In such a case, the segment (5, 2) that should perform black display will also be irradiated with the backlight, and thus the effect of local dimming cannot be fully exhibited.

Figure 4:
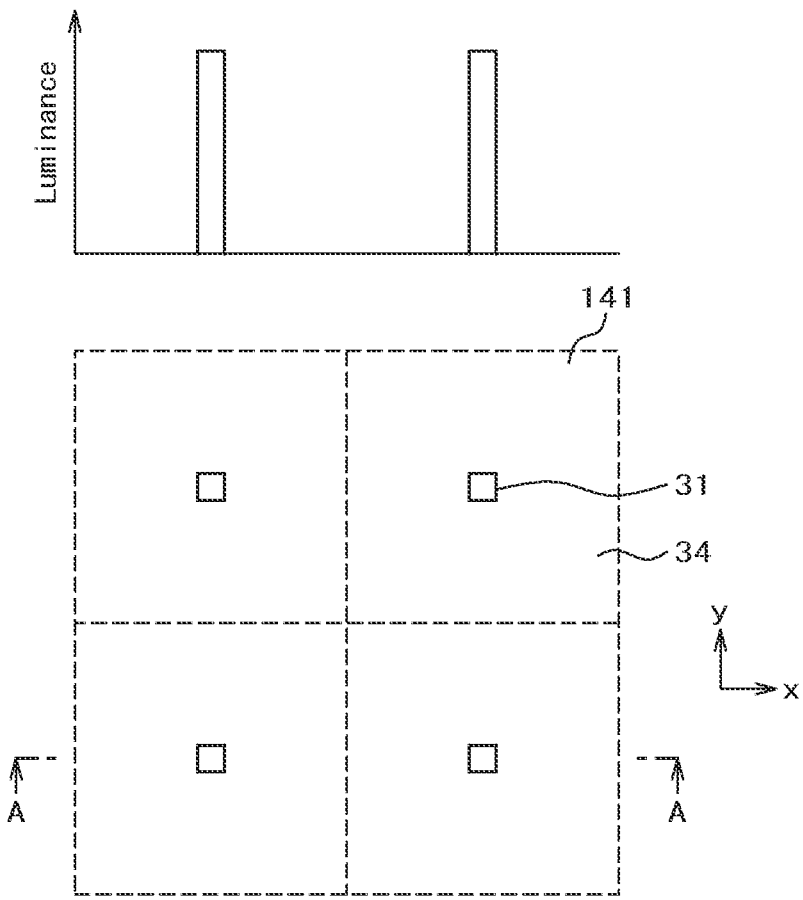
FIG. 4 shows a plan view of a light source section and luminance distribution of a light source.

FIG. 4 shows a plan view of four segments 141 extracted from FIG. 3. A blue LED 31 is disposed in the center of each segment. The blue LED 31 is called a mini LED, and has a planar shape of a square or rectangular shape with one side of 100 to 300 μm, for example. A reflective layer 34 made of white resin or the like is disposed around the blue LED 31. Each segment has a size of, for example, 2 mm. The size of each segment is defined by a distance between the blue LEDs 31.

The upper side of FIG. 4 shows luminance distribution of each LED. In this graph, the horizontal axis indicates a position, and the vertical axis indicates luminance. Since no diffusion sheet or the like exists over the light source, only a portion, in which the blue LED exists, is luminous. In this state, light has not yet passed through the color conversion sheet 40 and is thus blue.

Figure 5:
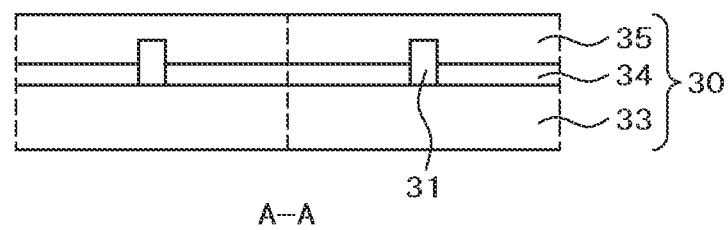
FIG. 5 is a cross sectional view of the light source section, corresponding to the A-A section in FIG. 4.

FIG. 5 is a cross sectional view of the light source 30, corresponding to the A-A section in FIG. 4. In FIG. 5, the blue LEDs 31 are disposed on a substrate 33. The reflective layer 34 made of white resin is formed on the upper side of the substrate 33. Each blue LED 31 and the reflective layer 34 are covered with a transparent resin 35 that serves as both a protective layer and a spacer. The transparent resin 35 is made of, for example, acrylic or polycarbonate.

Figure 6:
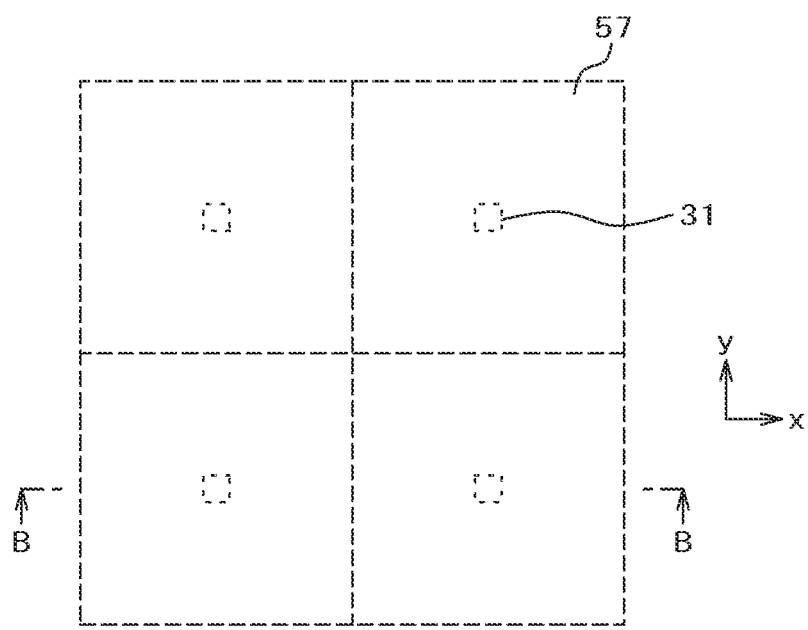
FIG. 6 is a plan diagram showing a phenomenon (visible chip) where a chip is visible from above a backlight.

FIG. 6 is a plan diagram showing a light source side viewed from above the backlight in which the optical sheet group 50 is disposed. In FIG. 6, the second prism sheet 57 disposed at the top of the optical sheet group is seen. In FIG. 6, the LED 31 is disadvantageously visible as shown by dotted lines. In other words, since the LED 31 shows high and sharp luminance, light is not sufficiently diffused and thus the LED 31 can be seen. If such a backlight is used in the liquid crystal display device, image quality is deteriorated.

Figure 7:
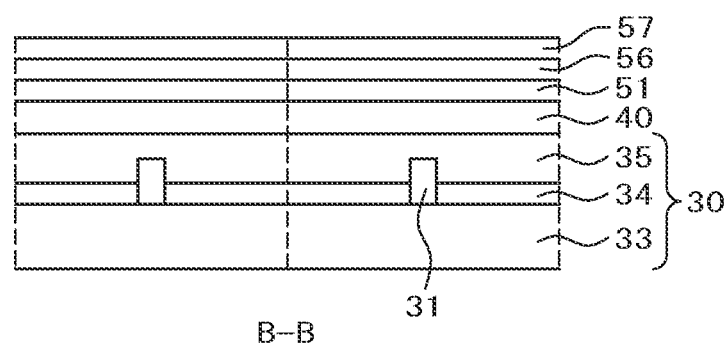
FIG. 7 is a cross sectional view of the backlight, corresponding to the B-B section in FIG. 6.

FIG. 7 is a cross sectional view of the backlight, corresponding to the B-B section in FIG. 6. In FIG. 7, the light source 30 is as described with FIG. 5. In FIG. 7, the color conversion sheet 40, a first diffusion sheet 51, a first prism sheet 56, and a second prism sheet 57 are placed on the transparent resin 35. The first prism sheet 56 and the second prism sheet 57 are used to converge light in the normal direction of the backlight.

In the color conversion sheet in FIG. 7, red quantum dots that capture blue light and emit red light, and green quantum dots that capture blue light and emit green light are dispersed. The blue light from the light source, the red light from the red quantum dots, and the green light from the green quantum dots are mixed to form white.

In FIG. 7, the first diffusion sheet 51 has a role of diffusing light from the light source to make the light to be less noticeable. However, FIG. 6 shows that the diffusion effect of the first diffusion sheet 51 alone is not sufficient, and the LED chips are observed from the surface of the backlight. Hereinafter, this phenomenon will also be referred to as "visible chip".

Figure 8:
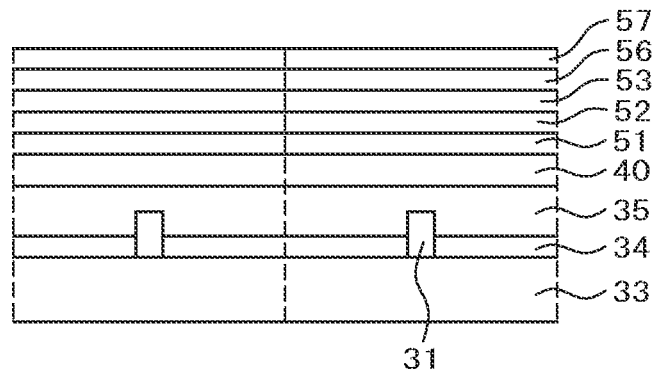
FIG. 8 is an exemplary cross sectional view of a backlight, in which a diffusion sheet is used to cope with visible chip.

FIG. 8 is a cross sectional view of the backlight when a second diffusion sheet 52 and a third diffusion sheet 53 are added to further enhance the diffusion effect, in order to cope with the visible chip. FIG. 8 differs from FIG. 7 in that the second diffusion sheet 52 and the third diffusion sheet 53 are inserted between the first diffusion sheet 51 and the first prism sheet 56. If merely adding a normal diffusion sheet is not enough for the diffusion effect, a diffusion sheet with a special splitting function may be disposed. Examples of the diffusion sheet having the special splitting function include one in which a microlens array having a diffusion effect is formed on a surface of the sheet.

Figure 9:
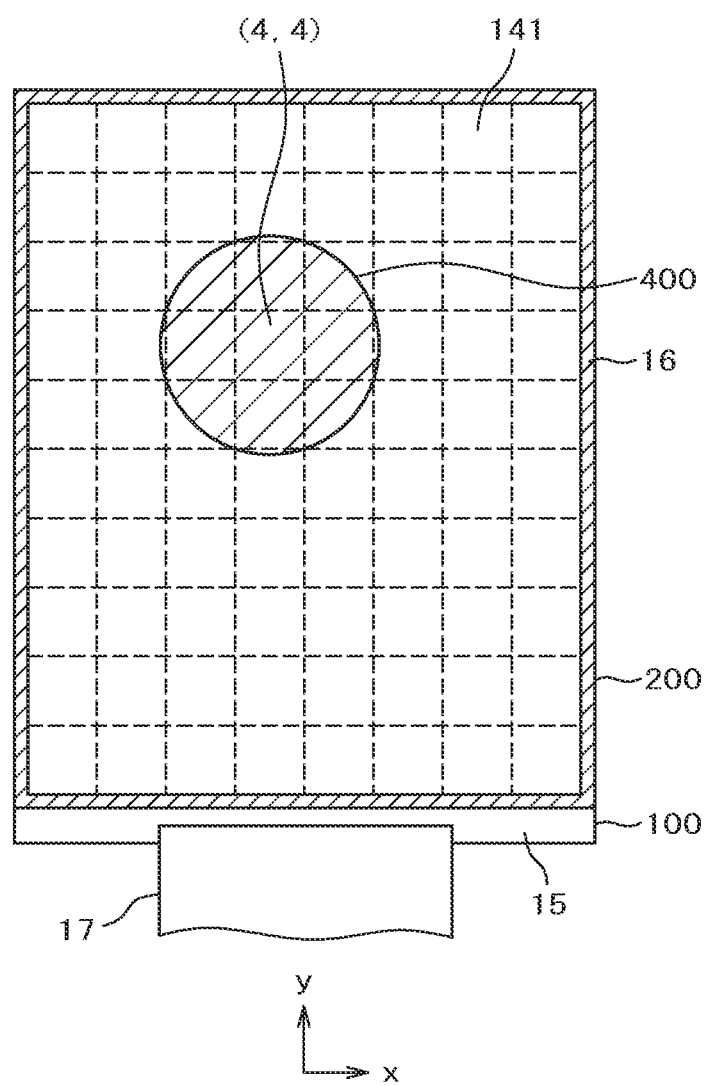
FIG. 9 is a plan view of a liquid crystal display device, showing a problem associated with FIG. 8.

However, if only the diffusion sheet is used to cope with the visible chip, local dimming cannot be accurately performed. For example, in FIG. 9, an irradiation region 400 shows an expanded region of irradiation light through local dimming. Even when only on the segment (4, 4) is desired to be irradiated, light is also supplied to the surrounding segments due to excessive diffusion effect of the diffusion sheet. In other words, even a segment, which is not desired to be irradiated with light, is irradiated with the light. Furthermore, as the number of diffusion sheets increases, front luminance of the backlight disadvantageously decreases due to the diffusion effect.

The invention is to cope with the above problems. The invention solves the visible chip by increasing size of the light source or by smoothing luminance distribution of the light source itself, in planar view. The invention will be described in detail below with some embodiments.

First Embodiment

Figure 10:
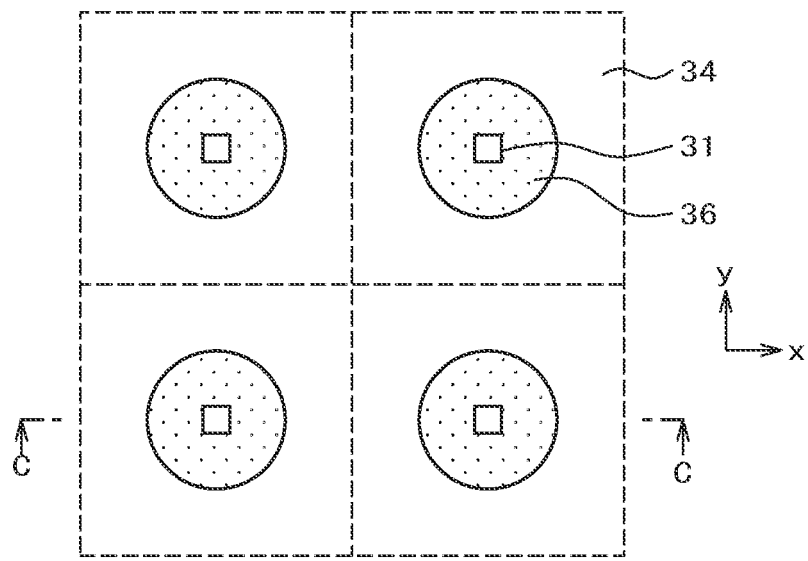
FIG. 10 shows a plan view of four segments of a light source section according to a first embodiment.
Figure 11:
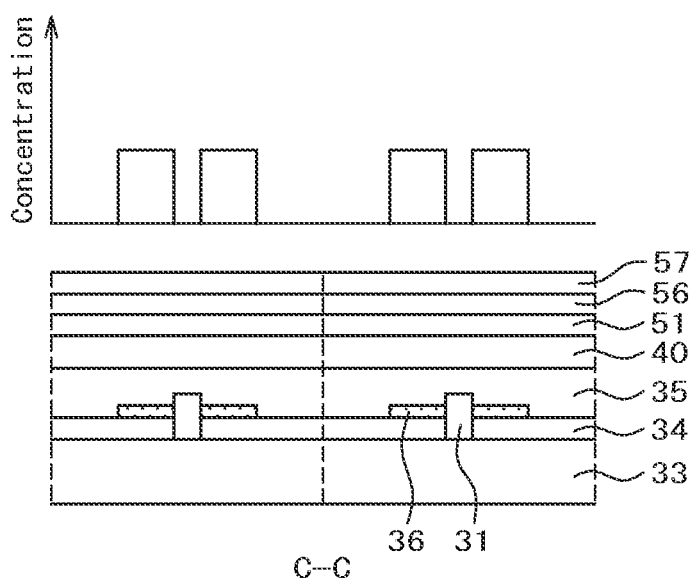
FIG. 11 is a cross sectional view of a backlight, corresponding to the C-C section in FIG. 10.

The lower side of FIG. 10 shows a plan view of a light source according to a first embodiment. The upper side of FIG. 10 shows luminance distribution of each LED. In this graph, the horizontal axis indicates a position, and the vertical axis indicates luminance. The plan view in FIG. 10 is a view of four segments. FIG. 11 is a cross sectional view of a backlight, corresponding to the C-C section in FIG. 10. In FIG. 10, the blue LED 31 is disposed in the center of the segment. An RG quantum dot layer 36, in which red quantum dots, which capture blue light and emit red light, and green quantum dots, which capture blue light and emit green light, are dispersed, is disposed surrounding the blue LED 31.

In FIG. 11, the blue LED 31 mainly emits light upwardly, but slightly emits light laterally. As illustrated in FIG. 11, such light is captured by the RG quantum dot layer 36. As a result, white light is also emitted upward from the RG quantum dot layer 36 and added to the blue light from the blue LED 31. The RG quantum dot layer 36 has a thickness of, for example, 50 µm.

The graph on the upper side of FIG. 10 shows luminance distribution of the light source in a state where light from the RG quantum dot layer 36 is added. As illustrated in FIG. 10, planar size itself of the light source is larger, and luminance distribution of the light source is gradual and has a base. In other words, since the light source in FIG. 10 originally has a gradual luminance distribution, it is possible to cope with the visible chip without using an additional diffusion sheet.

The diagram on the upper side of FIG. 11 shows concentration of RG quantum dots in the RG quantum dot layer 36. In this graph, the horizontal axis indicates a position, and the vertical axis indicates concentration. In FIG. 11, the RG quantum dots are uniformly distributed within the RG quantum dot layer 36. The RG quantum dot layer 36 is not formed in a portion of the blue LED 31. The quantum dot layer 36 can be formed by coating. The same applies to quantum dot layers 37 and 38 described later.

Figure 12:
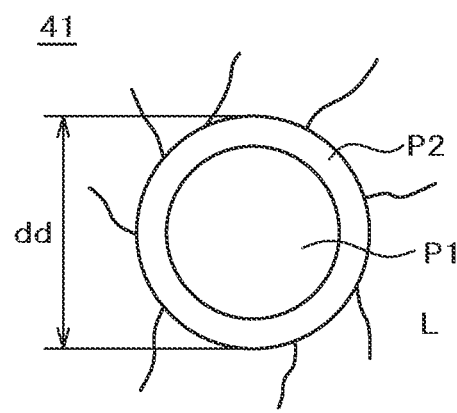
FIG. 12 is a schematic view of a quantum dot.

FIG. 12 is a schematic view of a quantum dot 41 used in the color conversion sheet 40 and the quantum dot layers 36, 37, and 38. The quantum dot 41 is a semiconductor fine particle, by which light is converted before being emitted, and the wavelength of the converted light differs depending on size of the particle. The diameter dd of the quantum dot 41 is generally 20 nm or less. In FIGS. 6, P1 and P2 each indicate a semiconductor. P1 is, for example, spherical CdSe, and P2, which is ZnS, covers around P1.

The quantum dot 41 confines incident light and emits light with a longer wavelength than the incident light. The incident light, which is emitted from the LED 31, may be blue light or ultraviolet light. In FIG. 12, the light from the LED 31 is blue light. L in the quantum dot 41 in FIG. 12 refers to a substance called a ligand, which makes the quantum dots 41 to be easily dispersed in the resin. The quantum dots 41 shown in FIG. 12 are dispersed in a transparent resin called a binder. Examples of the resin usable for the binder include, for example, silicone resin and epoxy resin.

Figure 13:
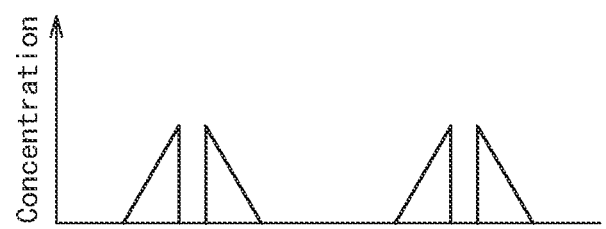
FIG. 13 shows a cross sectional view of a backlight according to a second aspect of the first embodiment.
Figure 13:
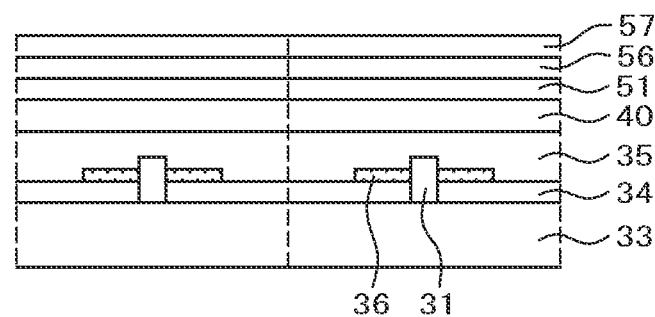

FIG. 13 shows a cross sectional view of a backlight showing a second aspect of the first embodiment. The cross sectional view of the backlight in FIG. 13 is the same as in FIG. 11. FIG. 13 differs from FIG. 11 in dispersion concentration of the quantum dots within the RG quantum dot layer 36.

The graph on the upper side of FIG. 13 shows the dispersion concentration of the quantum dots. In this graph, the horizontal axis indicates a position, and the vertical axis indicates concentration. In FIG. 13, dispersion concentration of the quantum dots is largest in a portion in contact with the blue LED 31, and decreases with an increase in distance from the blue LED 31. Since the dispersion concentration of the quantum dots is thus larger in the portion where the light from the blue LED is strongest, it can be said that the light source in FIG. 13 has high conversion efficiency.

Figure 14:
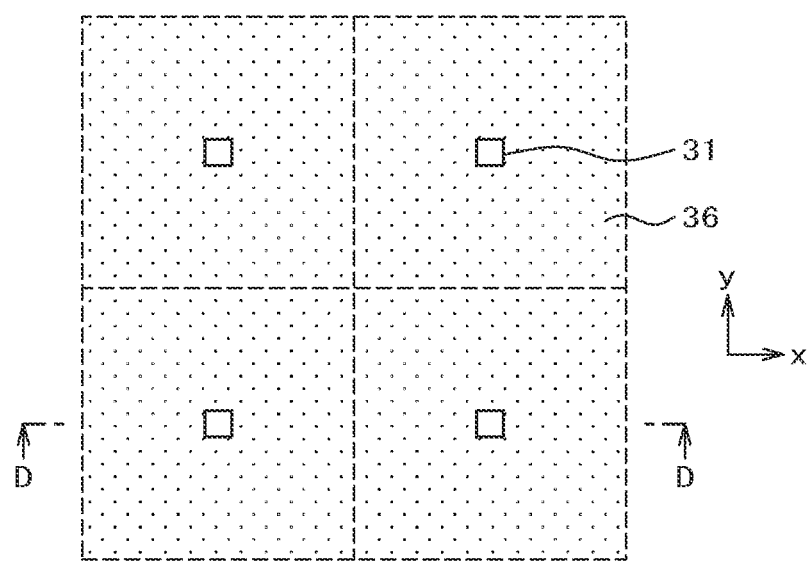
FIG. 14 shows a plan view of a backlight according to a third aspect of the first embodiment.

FIG. 14 shows a plan view of a light source section according to a third aspect of the first embodiment. In this graph, the horizontal axis indicates a position, and the vertical axis indicates luminance. FIG. 14 differs from FIG. 11 in that the quantum dot layer 36 is disposed not only around the blue LED but over the entire segment. The graph on the upper side of FIG. 14 is an example of distribution of light emitted from a light source in this configuration. As shown in the graph, the emitted light gradually decreases toward the periphery of the segment, while size of the light source itself increases and the base of the distribution becomes more gradual. In this configuration, therefore, it is more difficult to see the chip from above the backlight.

Figure 15:
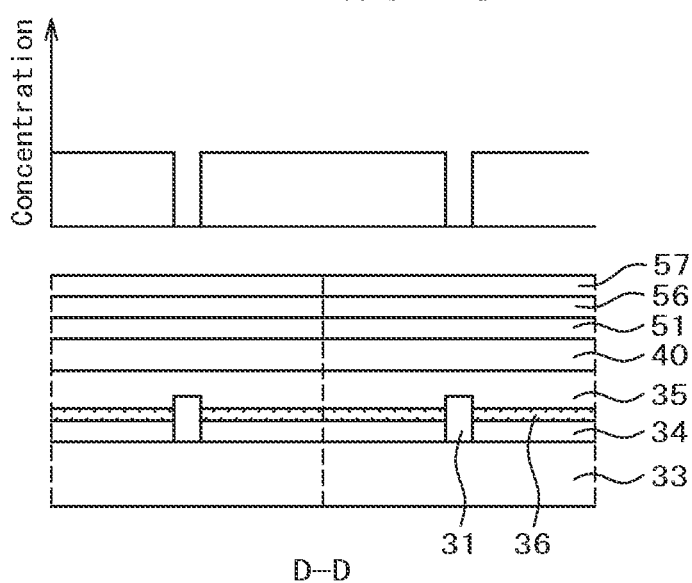
FIG. 15 shows a cross sectional view of the backlight, corresponding to the D-D section in FIG. 14.

FIG. 15 shows a cross sectional view of the backlight, corresponding to the D-D section in FIG. 14. The configuration of the backlight in FIG. 15 is the same as in FIG. 11, except that the RG quantum dot layer 36 is formed over the entire surface. The graph on the upper side of FIG. 15 shows dispersion concentration of the RG quantum dots in the RG quantum dot layer 36. In the example shown in FIG. 15, the RG quantum dots are uniformly distributed over the entire surface. Such uniform dispersion concentration of the RG quantum dots over the entire surface probably leads to easy manufacturing process.

Figure 16:
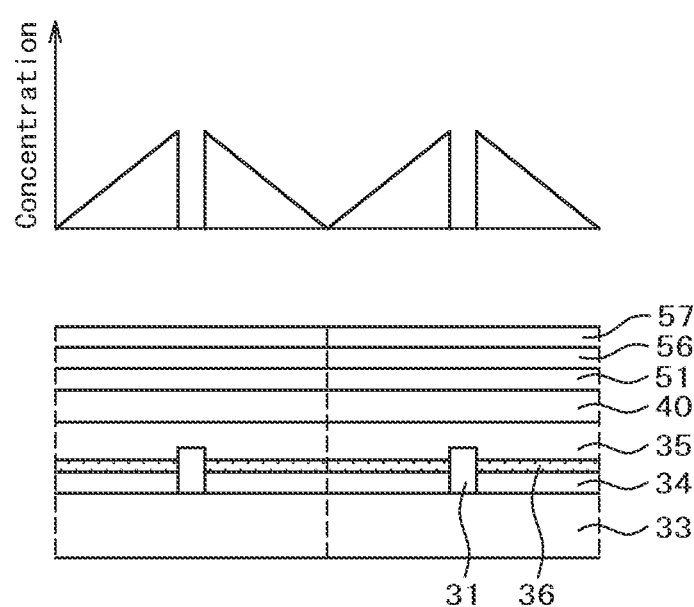
FIG. 16 shows a cross sectional view of a backlight according to a fourth aspect of the first embodiment.

FIG. 16 shows a cross sectional view of a light source section according to a fourth aspect of the first embodiment. The plan view corresponding to FIG. 16 is the same as FIG. 14. The cross sectional view of the backlight in FIG. 16 is the same as in FIG. 15. FIG. 16 differs from FIG. 15 in dispersion concentration of the RG quantum dots shown in the upper side of FIG. 16. As illustrated in FIG. 16, the concentration of the RG quantum dots is highest in the portion in contact with the blue LED 31, and gradually decreases toward the periphery of the segment. The concentration of the RG quantum dots is larger in the vicinity of the blue LED 31, in which luminance of blue light is largest, resulting in high conversion efficiency. It is therefore possible to efficiently produce a light source that is less likely to cause visible chip.

Second Embodiment

Figure 17:
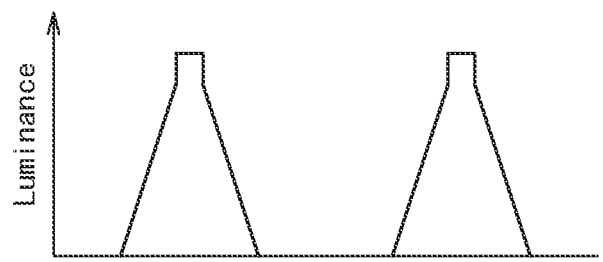
FIG. 17 shows a plan view of four segments of a light source section according to a second embodiment.
Figure 17:
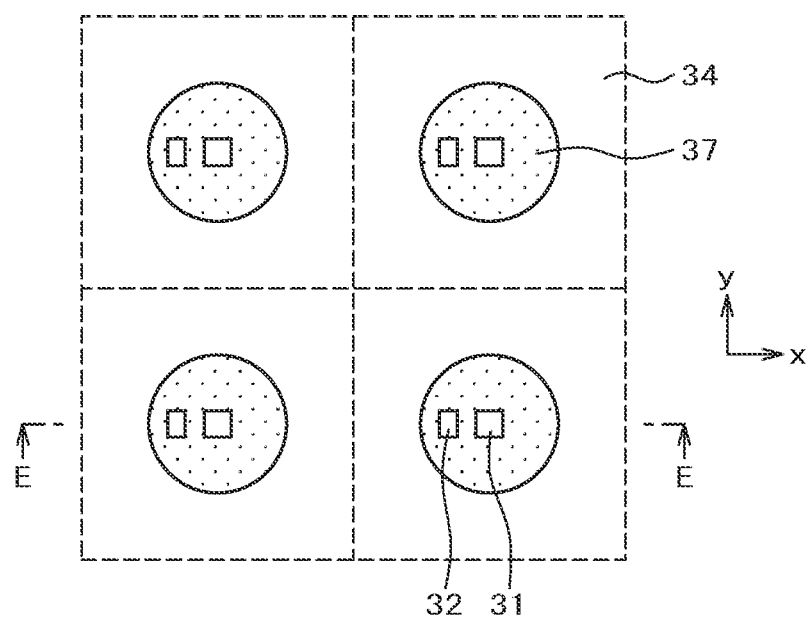
Figure 18:
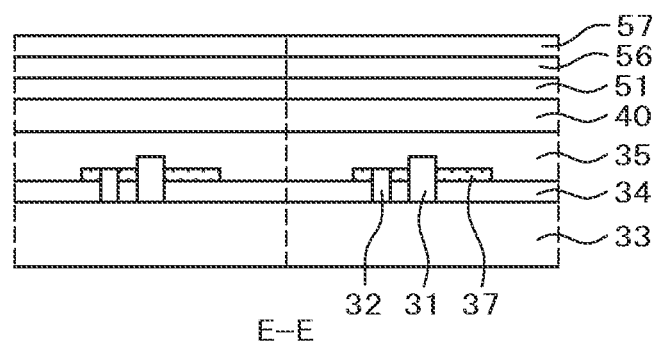
FIG. 18 is a cross sectional view of a backlight, corresponding to the E-E section in FIG. 17.

FIG. 17 shows a plan view and luminance distribution of a light source section in a second embodiment. The plan view in FIG. 17 is a view of four segments. FIG. 18 is a cross sectional view of a backlight, corresponding to the E-E section in FIG. 17. In FIG. 17, the blue LED 31 is disposed in the center of the segment. An RGB quantum dot layer 37, in which red quantum dots, which capture blue light and emit red light, green quantum dots, which capture blue light and emit green light, and blue quantum dots, which capture light with a shorter wavelength than blue and emit blue light, are dispersed, is disposed surrounding the blue LED 31.

In FIG. 17, a short-wavelength LED 32 emitting short-wavelength light is disposed to excite the blue quantum dots in the RGB quantum dot layer 37. The short-wavelength LED 32 is structured to emit light mainly in a horizontal direction, and such light is efficiently captured by the RGB quantum dot layer 37. The short-wavelength LED 32 may have any emission wavelength without limitation as long as it can excite the blue quantum dots. The short-wavelength LED 32 may thus be a purple LED or an ultraviolet LED.

As in the first embodiment, blue light is also emitted horizontally from the blue LED 31, and excites the red quantum dots and the green quantum dots dispersed in the RGB quantum dot layer 37 to emit red light and green light, respectively. As illustrated in FIG. 18, since the reflective layer 34 exists below the RGB quantum dot layer 37, white light is emitted upward from the RGB quantum dot layer 37. This light is superimposed on the light going upward from the blue LED.

The graph on the upper side of FIG. 17 shows luminance distribution of light emitted from that light source. As shown in this graph, the area of the light source itself is larger, and luminance distribution of the light source is gradual and has a base. It is therefore possible to cope with the visible chip without using an additional diffusion sheet. Although blue light is strong in the vicinity of a peak in the distribution shown in FIG. 17, the blue light is converted to white light by the color conversion sheet 40.

Figure 19:
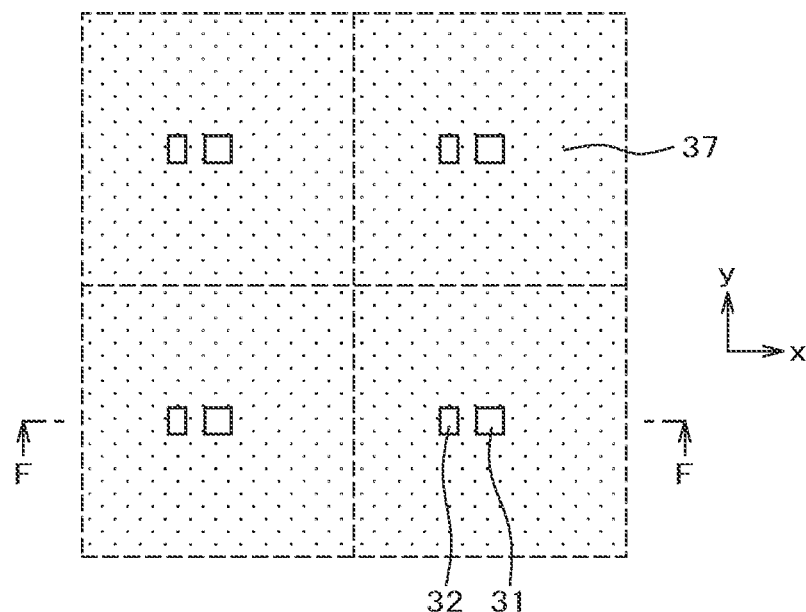
FIG. 19 shows a plan view of a light source section according to a second aspect of the second embodiment.
Figure 20:
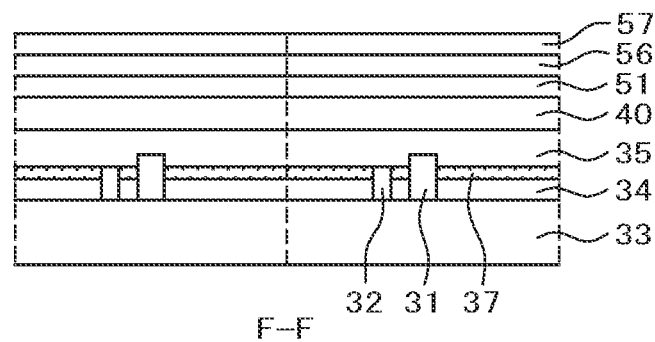
FIG. 20 is a cross sectional view of a backlight, corresponding to the F-F section in FIG. 19.

FIG. 19 shows a plan view of a light source section, showing a second aspect of the second embodiment. FIG. 20 is a cross sectional view of the backlight, corresponding to the F-F section in FIG. 19. FIGS. 19 and 20 differ from FIGS. 17 and 18, respectively, in that the RGB quantum dot layer 37 is disposed not only around the blue LED 31 but over the entire segment.

The effect of the RGB quantum dot layer 37 is the same as described with FIGS. 17 and 18. The diagram on the upper side of FIG. 19 is a graph showing distribution of light emitted from the light source section. In the configuration shown in FIGS. 19 and 20, since white light is emitted from a wider area, it is possible to produce emitted light having a larger area and a more gradual distribution than the emitted light described with FIGS. 17 and 18. It is therefore possible to cope with the visible chip effectively.

Third Embodiment

Figure 21:
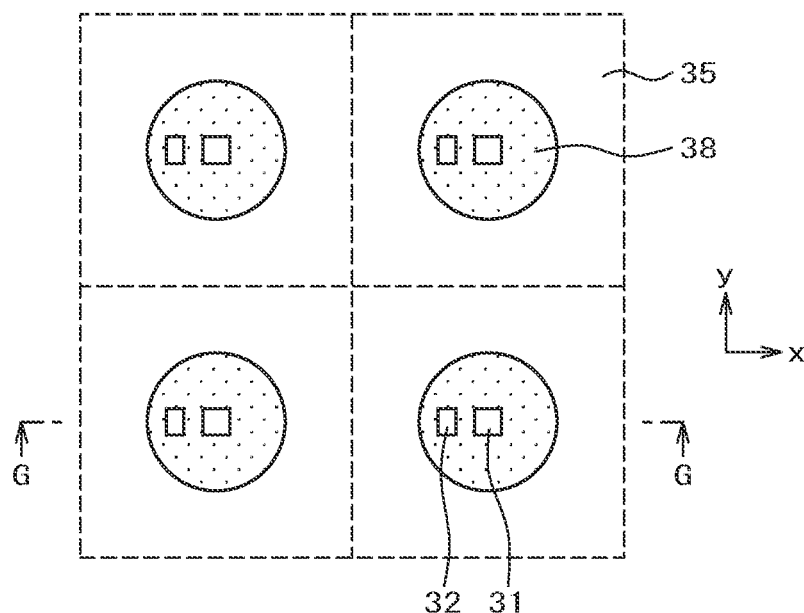
FIG. 21 shows a plan view of four segments of a light source section according to a third embodiment.
Figure 22:
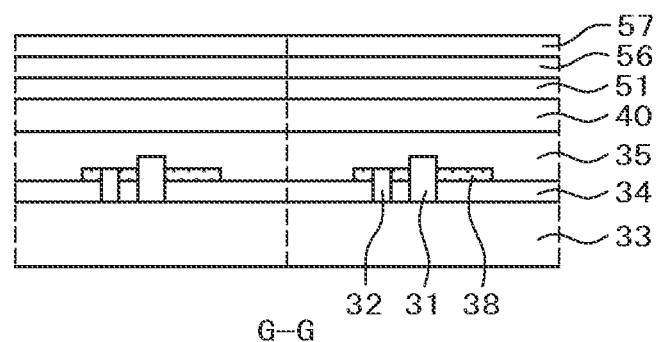
FIG. 22 is a cross sectional view of a backlight, corresponding to the G-G section in FIG. 21.

FIG. 21 shows a plan view of a light source section in a third embodiment. The plan view in FIG. 21 is a view of four segments. FIG. 22 is a cross sectional view of the backlight, corresponding to the G-G section in FIG. 21. In FIG. 21, the blue LED 31 is disposed in the center of the segment. B quantum dot layer 38, in which blue quantum dots, which capture light with a shorter wavelength than blue and emit blue light, are dispersed, is disposed surrounding the blue LED 31.

In FIG. 21, a short-wavelength LED 32 emitting short-wavelength light is disposed to excite the blue quantum dots in the B quantum dot layer 38. The short-wavelength LED 32 is structured to emit light mainly in a horizontal direction, and such light is efficiently captured by the B quantum dot layer 38.

As illustrated in FIG. 22, since the reflective layer 34 exists below the B quantum dot layer 38, blue light is emitted upward from the B quantum dot layer 38. This light is superimposed on the light going upward from the blue LED 31.

The graph on the upper side of FIG. 21 shows luminance distribution of light emitted from that light source. As shown in this graph, the area of the light source itself is larger, and luminance distribution of the light source is gradual and has a base. It is therefore possible to cope with the visible chip without using an additional diffusion sheet. In the distribution shown in FIG. 21, unlike the first and second embodiments, the light is blue light in both the vicinity of a peak and the base. The blue light is converted to white light by the color conversion sheet 40.

Figure 23:
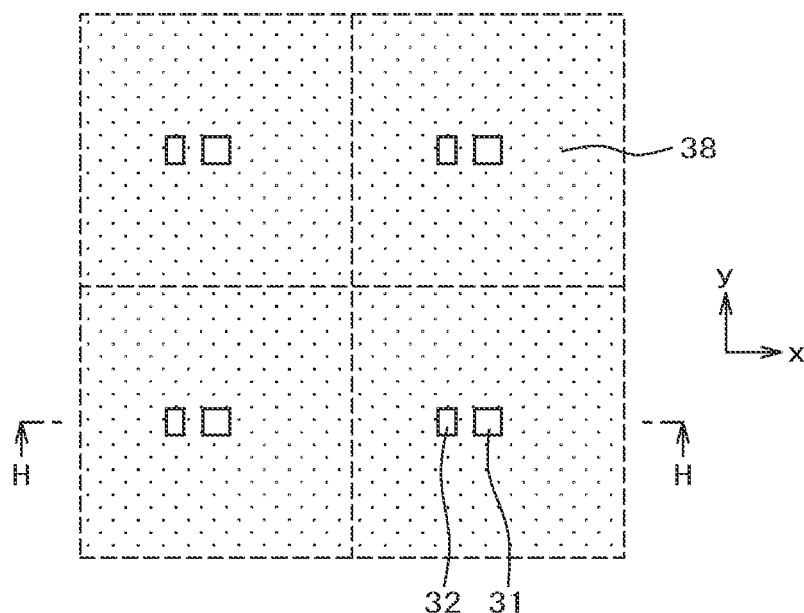
FIG. 23 shows a plan view of a light source section according to a second aspect of the third embodiment.
Figure 24:
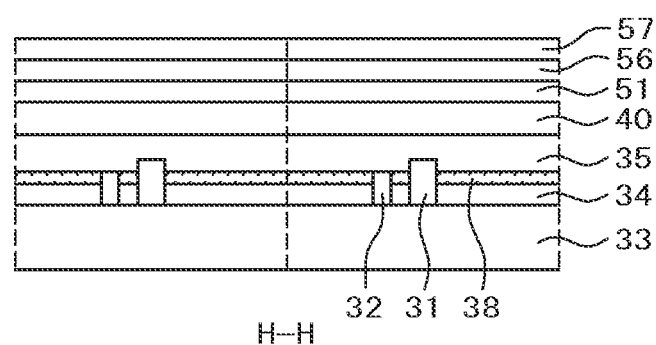
FIG. 24 is a cross sectional view of a backlight, corresponding to the H-H section in FIG. 23.

FIG. 23 shows a plan view of a light source section, showing a second aspect of the third embodiment. FIG. 24 is a cross sectional view of the backlight, corresponding to the H-H section in FIG. 23. FIGS. 23 and 24 differ from FIGS. 21 and 22, respectively, in that the B quantum dot layer 38 is disposed not only around the blue LED 31 but over the entire segment.

The effect of the RGB quantum dot layer 38 is the same as described with FIGS. 21 and 22. The graph on the upper side of FIG. 23 shows distribution of light emitted from the light source section. In the configuration shown in FIGS. 23 and 24, since white light is emitted from a wider area, it is possible to produce emitted light having a larger area and a more gradual distribution than the emitted light described with FIGS. 21 and 22. It is therefore possible to cope with the visible chip effectively.

Figure 25:
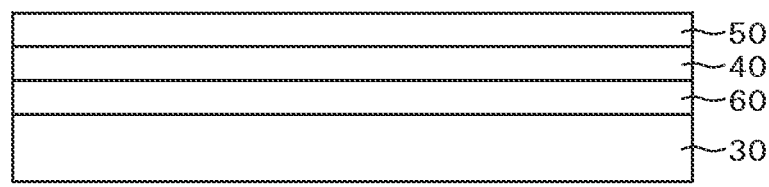
FIG. 25 is a cross sectional view of another exemplary backlight.
Figure 26:
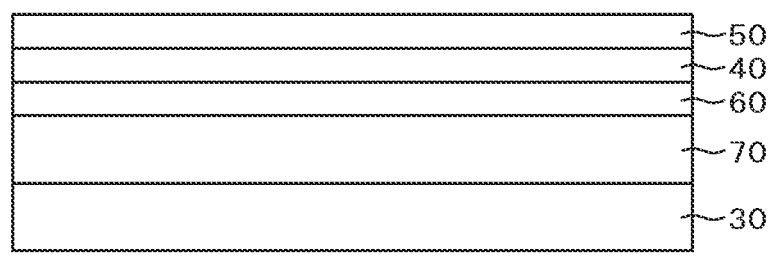
FIG. 26 is a cross sectional view of still another exemplary backlight.

In the above embodiments, description has been given on the configuration of the backlight 20 shown in FIG. 2. However, the invention can be applied to various backlights other than the backlight shown in FIG. 2. The backlight of FIG. 25 is an exemplary backlight, which includes a dichroic sheet 60 disposed between the light source 30 and the color conversion sheet 40, in addition to the configuration of the backlight of FIG. 2. The backlight of FIG. 26 is an exemplary backlight, which includes a polycarbonate plate 70 disposed between the light source 30 and the dichroic sheet 60, in addition to the configuration of FIG. 25. The polycarbonate plate 70 has extremely high transmittance and thus can be used in place of a space provided between the light source and the dichroic sheet or another sheet.

Although a quantum dot sheet has been used as the color conversion sheet in the above description, a phosphor sheet can be used in the same way.

What is claimed is:

1. A backlight, comprising:
   a light source in which blue LEDs are planarly arranged in a matrix with a first interval; and
   a color conversion sheet disposed covering the light source,
   wherein first red quantum dots that receive blue light and emit red light, and first green quantum dots that receive blue light and emit green light are dispersed in the color conversion sheet,
   an RG quantum dot layer is disposed around each of the blue LEDs in planar view, and second red quantum dots that receive blue light and emit red light and second green quantum dots that receive blue light and emit green light are dispersed in the RG quantum dot layer,
   each of the blue LEDs is a rectangle shape having four side surfaces, which are a first side surface, a second side surface, a third side surface and a fourth side surface, and
   the first side surface, the second side surface, the third side surface and the fourth side surface are in contact with the RG quantum dot layer, and
   the RG quantum dot layers cover the entire surface between the plurality of blue LEDs in planar view.

2. The backlight according to claim 1, further comprising a reflective layer, wherein the RG quantum dot layer is formed on the reflective layer.

3. The backlight according to claim 1, wherein the RG quantum dot layer is formed to enclose the blue LED in a predetermined width in planar view, and does not exist in any other portion.

4. The backlight according to claim 1, wherein in the RG quantum dot layer, concentration of the second red quantum dots and concentration of the second green quantum dots are each higher in the vicinity of the blue LED than in another region.

5. A liquid crystal display device, comprising a liquid crystal display panel, and a backlight on a back surface of the liquid crystal display panel, wherein the backlight is the backlight according to claim 1.

6. A backlight, comprising:
   a light source in which blue LEDs are planarly arranged in a matrix with a first interval; and
   a color conversion sheet disposed covering the light source,
   wherein first red quantum dots that receive blue light and emit red light, and first green quantum dots that receive blue light and emit green light are dispersed in the color conversion sheet,
   an RGB quantum dot layer is disposed around each of the blue LEDs in planar view, and second red quantum dots that receive blue light and emit red light, second green quantum dots that receive blue light and emit green light, and blue quantum dots that receive light with a shorter wavelength than blue light or receive ultraviolet rays and emit blue light are dispersed in the RGB quantum dot layer,
   a short-wavelength LED emitting the shorter-wavelength light is disposed within a range where the RGB quantum dot layer is formed in planar view,
   the blue LED has a rectangular shape having a first four sides in plan view,
   the short-wavelength LED has a rectangular shape having a second four side in plan view, and
   the RGB quantum dot layer is in contact with the first four sides of the blue LED and the second four sides of the short-wavelength LED.

7. The backlight according to claim 6, further comprising a reflective layer, wherein the RGB quantum dot layer is formed on the reflective layer.

8. The backlight according to claim 6, wherein the RGB quantum dot layer is formed to enclose the blue LED in a predetermined width in planar view, and does not exist in any other portion.

9. The backlight according to claim 6, wherein the RGB quantum dot layers cover the entire surface between the plurality of blue LEDs in planar view.

10. A liquid crystal display device, comprising a liquid crystal display panel and a backlight on a back surface of the liquid crystal display panel, wherein the backlight is the backlight according to claim 6.

11. A backlight, comprising: a light source in which blue LEDs are planarly arranged in a matrix with a first interval; and a color conversion sheet disposed covering the light source, wherein first red quantum dots that receive blue light and emit red light, and first green quantum dots that receive blue light and emit green light are dispersed in the color conversion sheet, a B quantum dot layer is disposed around each of the blue LEDs in planar view, and blue quantum dots that receive light with a shorter wavelength than blue light or receive ultraviolet rays and emit blue light are dispersed in the B quantum dot layer, a short-wavelength LED emitting the shorter-wavelength light is disposed within a range where the B quantum dot layer is formed in planar view, the blue LED has a rectangular shape having a first four sides in plan view, the short-wavelength LED has a rectangular shape having a second four sides in plan view, and the B quantum dot layer is in contact with the first four sides of the blue LED and the second four sides of the short-wavelength LED.

12. The backlight according to claim 11, further comprising a reflective layer, wherein the B quantum dot layer is formed on the reflective layer.

13. The backlight according to claim 11, wherein the B quantum dot layer is formed to enclose the blue LED in a predetermined width in planar view, and does not exist in any other portion.

14. The backlight according to claim 11, wherein the B quantum dot layers cover the entire surface between the plurality of blue LEDs in planar view.

15. A liquid crystal display device, comprising a liquid crystal display panel and a backlight on a back surface of the liquid crystal display panel, wherein the backlight is the backlight according to claim 11.

* * * * *